Nov. 29, 1966     S. N. SCHLEIN     3,288,918
APPARATUS FOR SECURING LINES TO SUPPORTS
Filed Feb. 16, 1965     5 Sheets-Sheet 1
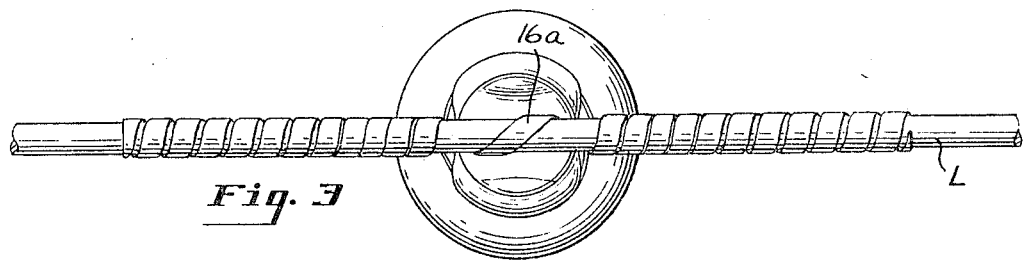
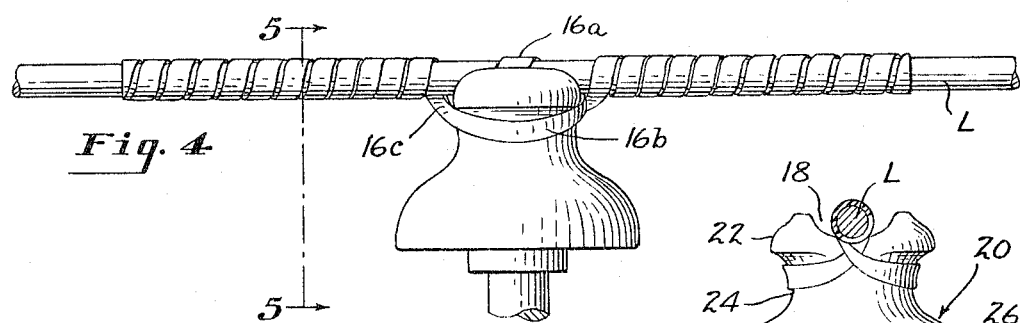
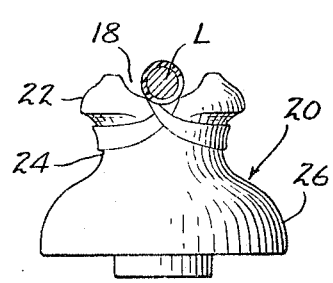
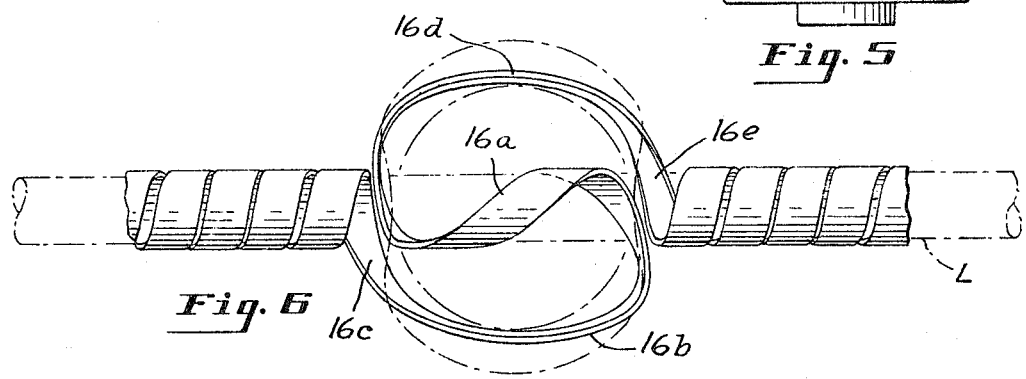
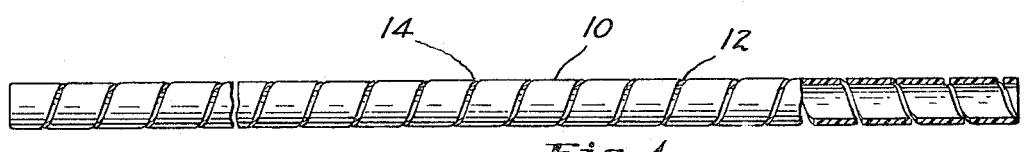
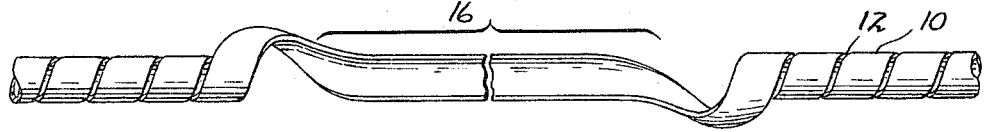
INVENTOR
Seymour N. Schlein
BY
his ATTORNEYS Nov. 29, 1966 S. N. SCHLEIN 3,288,918
APPARATUS FOR SECURING LINES TO SUPPORTS
Filed Feb. 16, 1965 5 Sheets-Sheet 3
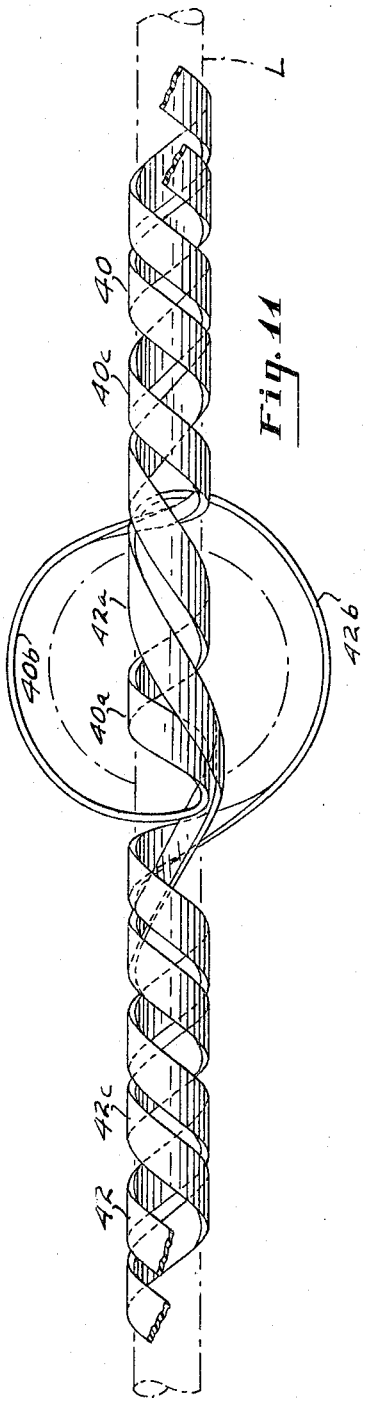
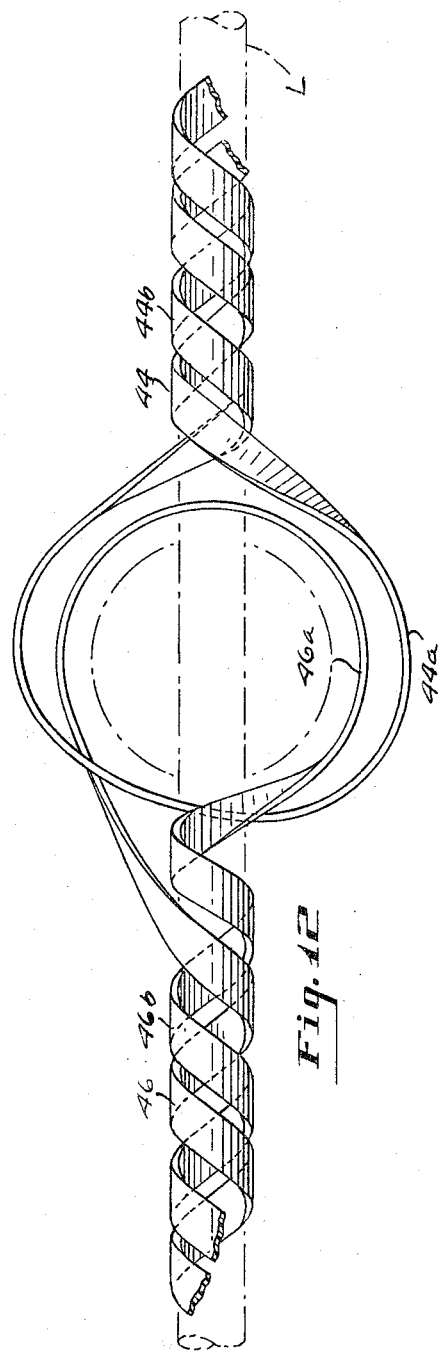
INVENTOR
Seymour N. Schlein
BY J. W. Douglas
 Her ATTORNEYS

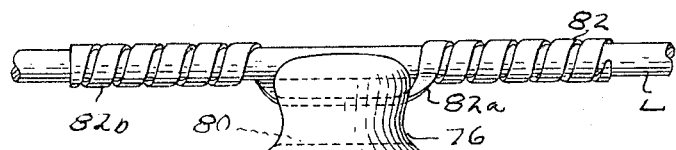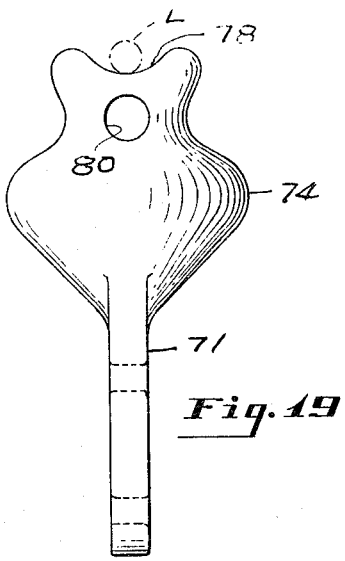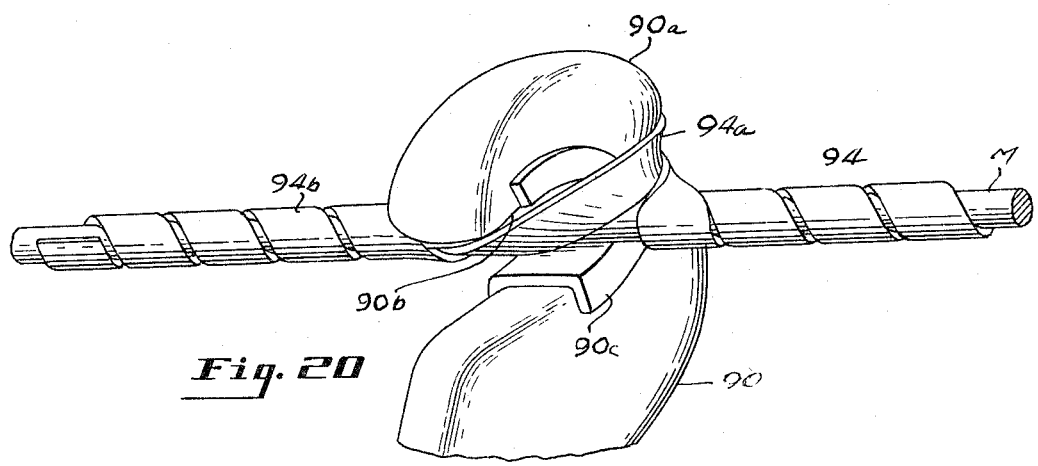

United States Patent Office 3,288,918
Patented Nov. 29, 1966

3,288,918
APPARATUS FOR SECURING LINES
TO SUPPORTS
Seymour N. Schlein, University Heights, Ohio, assignor to The Fanner Manufacturing Company, a division of Textron Inc., Cleveland, Ohio, a corporation of Rhode Island
Filed Feb. 16, 1965, Ser. No. 433,048
9 Claims. (Cl. 174—173)

This invention relates to a method and means for tying lines, such as telephone and power lines, to a support and more particularly to a device which has a universal tying application.

Heretofore, as is well known to those versed in the art, it was common practice to secure various types of lines to a support, such as an insulator or sheave, wherein the line was disposed in a groove and tied in place by the use of soft annealed wire wrapped around the support and line. Such expedients had certain disadvantages in that they were difficult to apply and required considerable skill on the part of the linesman to produce a tie that did not fail in a short time. Even the most skillfully applied ties had a tendency, due to the vibrations of the line, to become loose with the passage of time.

Recently there has come into being ties that were of the preformed character where the tying material was made of preformed wire in the factory prior to installation. Such ties had to be designed for a particular size and shape for the support and line which were to be tied together and could only be used in one particular manner. Obviously it was necessary to carry in stock a large number of different sized devices to enable the different sizes of lines and supports to be secured together.

The present tie contemplates a tie which is substantially universal in its application, one size enabling a large number of different sized supports and conductors to be secured together. Furthermore the tie lends itself to many ways of application, the tie being of a simple form as made in the factory and capable of being distorted to many different forms when applied to the line and support in the field.

In addition, the tie, which may be made of a resilient plastic material, retains its tying properties for a much longer period than the previous ties. It also is of the character which can be quickly and easily removed and secured with the simplest of tools or by hand. There is also a need for a tie of plastic construction with no metal parts.

Still other advantages of the invention and the invention itself will become more apparent from the following description of some embodiments thereof, which description is illustrated by the accompanying drawings and forms a part of this specification.

In the drawings:

FIG. 1 is a fragmentary elevational view, with a portion shown in section of a tying element prior to application;

FIG. 2 is a fragmentary elevational view of the tie of FIG. 1, showing a step prior to installation;

FIG. 3 is a top plan view of the tie applied to a common form of insulator;

FIG. 4 is a side elevational view thereof;

FIG. 5 is a section taken from the line 5—5 of FIG. 4, looking in the direction of the arrows;

FIG. 6 is an enlarged fragmentary plan view of the tie of FIG. 3 with the insulator and line shown in phantom;

FIG. 11 is a view similar to that of FIG. 6, showing the use of two elements to make a tie;

FIG. 12 is an expanded view of FIG. 11;

FIG. 18 is a side elevational view of the tie as used with another form of support;

FIG. 19 shows the support at right angles to FIG 18; and

FIG. 20 shows the tie as used to hold a line in a line spreader.

Figure 7:
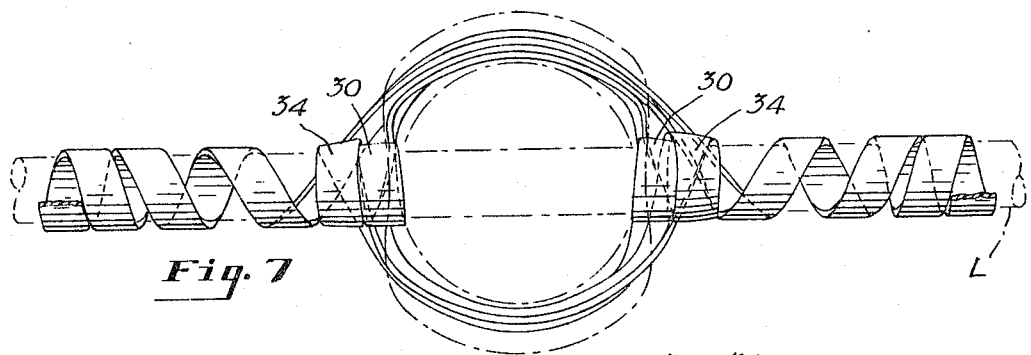
FIG. 7 is a view similar to FIG. 6, showing another manner of using the tie.
Figure 8:
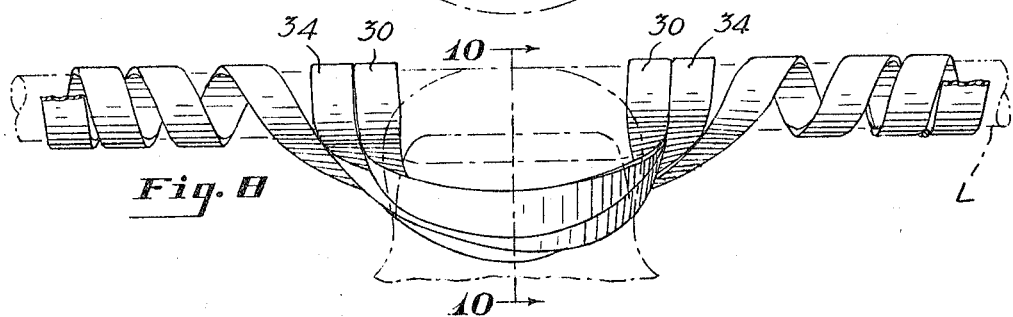
FIG. 8 is an elevational view of the tie of FIG. 7.

Briefly, the invention contemplates the manufacture of a helical ribbon of highly resilient material having closed convolutions and which ribbon can have some of the convolutions intermediate its ends unwrapped or opened up by hand and applied to a support for a line and the end convolutions wrapped around the line to hold the line in supported engagement with the support. In addition, the character of the tie is such that the unwrapped portion can be wrapped around the line at the support to provide further securing of the line thereto. It is contemplated that one or more such members may be used.

More particularly one of the tie elements is illustrated in FIG. 1. It comprises a tube of polyvinyl chloride or other resilient plastic material 10 which is slit helically throughout its length at 12 to provide a ribbon helix having closed convolutions. It is pointed out that the material can be any of the well known resilient plastics or of resilient metal. The plastic may be of the insulating type or it may be conductive. In addition, the element can be made in other ways than described, such as by extruding or by winding a ribbon around a heated mandrel. Although the preferred form is that with the closed convolution of the helix it is also contemplated that the adjacent convolutions could be spaced apart if desired.

The inside diameter of the element should be less than the diameter of a line to which it is to be applied. Due to its flexibility the element can be made for a diameter of line that is quite small and its resiliency allows it to be applied to lines having a considerably larger diameter than the inside diameter of the element, thus materially extending its range of use.

The flexibility of the element is such that it may be grasped at its mid-portion and the thumbs and forefinger which are inserted between the adjacent convolutions of the helix at the point indicated by the arrow 14 and then the hands spread apart to unroll several of the convolutions to provide a zone 16, FIG. 2. If the element was released at this time, it would return to its original helical form but so long as the outward pressure is retained it will stay in the form shown.

Previously the line L had been laid in the top groove 18 of a support 20, which may be an insulator. The particular insulator illustrated is one having a head 22 bisected by the groove 18 and below the head a neck 24 and a flared skirt 26.

The element, which has been distorted to the shape shown in FIG. 2, then has the mid-point 16a of the zone 16 placed over the top of the line and wrapped around the line to form a wrap of substantially one-half a pitch length. More than one convolution of the helix, as shown in FIG. 1, may be straightened out as per FIG. 2 to provide the desired length. At the right end, as viewed in FIGS. 6 and 4, the zone 16 of the element is carried back around the neck at 16b, which is the near side as viewed in FIG. 4, and back to the line, where it is then carried up at 16c and wrapped around the line, the remainder of this portion of the element being wrapped around the line. The other end of the zone 16, to the left as viewed in FIG. 6, is carried around the neck of the insulator at 16d, then up at 16e and then wrapped around the line.

Obviously the element could be applied to the line at one side of the insulator and then the zone 16 formed while the one end was secured on the line and the zone 16 wrapped around the insulator starting from the side 16c or 16e to provide the same tie.

After the tie is applied the resiliency of the material holds the tie in place on each side of the line and the tendency of the parts which surround the insulator to their helical form, cause the tie to closely grip the insulator. At the point where the tie surrounds the line, on either side of the point 16a, the tie completely surrounds the line and extends between the bottom of the insulator groove and the line, thus providing a resilient cushion for the line in the bottom of the insulator. It is apparent that the convolution 16a which surrounds the line could be a series of convolutions instead of a partial one.

If desired, the material of the tie can have embedded therein a suitable gritty material to increase its holding power with the line, or the material can be applied to the inner surface of the helix as a layer. The character of the material lends itself to having the abrasive attached to the inner suurface by heating to the softening point and then applying the grit. The material of the tie can also be reinforced with a suitable fiber, such as glass or fabric, to decrease its tendency to stretch for certain applications and increase the strength thereof.

Figure 9:
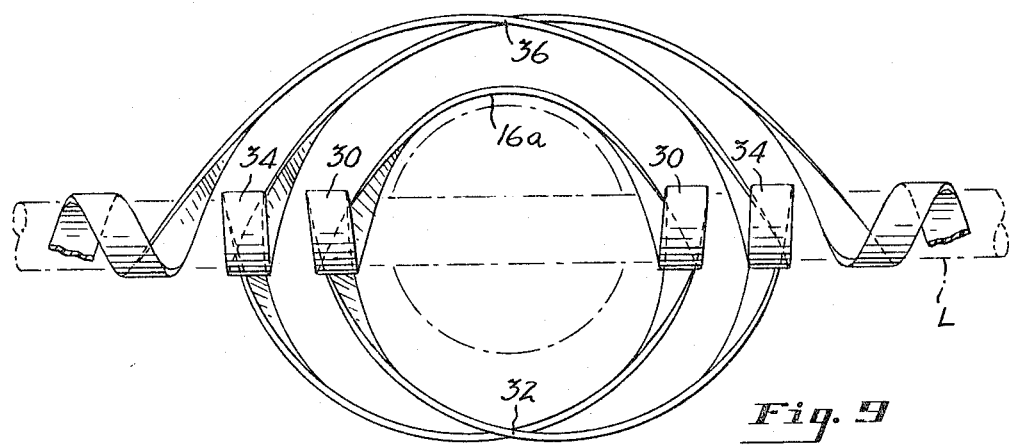
FIG. 9 is an expanded view of the tie of FIG. 7, to more clearly show its manner of application.
Figure 10:
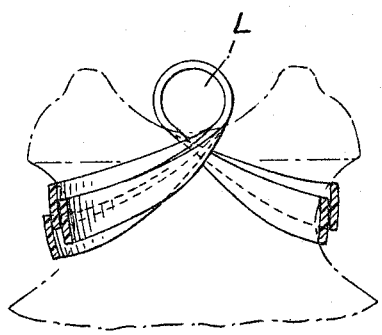
FIG. 10 is a section taken from the line 10—10 of FIG. 8.
Figure 13:
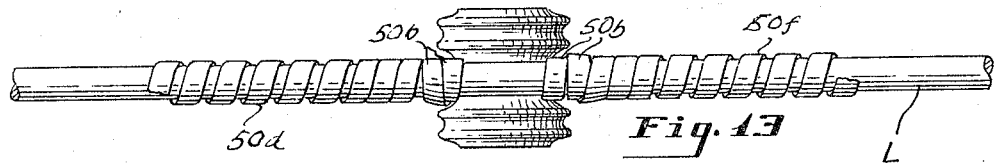
FIGS. 13 and 14 are top plan and side elevational views of the tie as applied to a spool type support.
Figure 14:
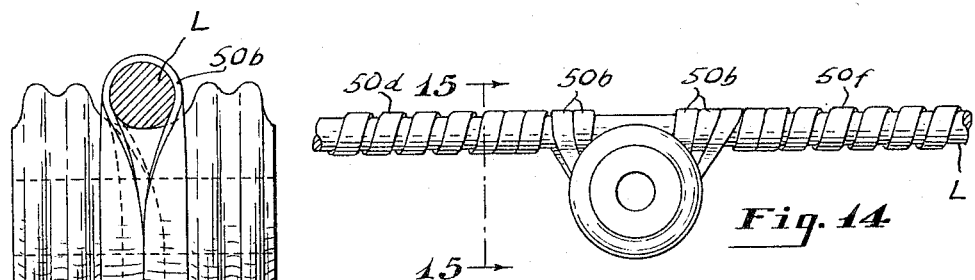
Figure 15:
FIG. 15 is a view of the line 15—15 of FIG. 14.

FIGS. 7 and 10 inclusive illustrate another manner of forming a tie, the application of which can best be understood from FIG. 9. It illustrates how the device may be used to increase the tie's ability to hold the line in the insulator groove. The device provides two loops around the insulator neck and two bights around each side of the line adjacent the insulator on opposite sides.

In this instance, the straightened portion 16 is considerably longer than that of FIG. 6 and the point 16a is aplied to the side of the insulator neck, carried around in opposite directions and then each is wrapped around the line to provide bights on the line on opposite sides of the insulator. Next the parts again continue in opposite directions, crossing over at 32 and are carried back to the line where they are each again wrapped around the line at 34. They are then carried around the neck of the insulator, each going to the opposite side, crossing over at 36, back to and wrapped around and along the line in opposite directions. The structure provides two bights on each of the opposite sides of the insulator and two complete loops around the neck.

The resiliency of the material and its tendency to return to its original form causes the loops or bights 30–34 to securely grip the line. At the same time the parts connecting to the second bights 34 pull these bights toward the first bight and cause them to crowd the first bights. In some instances, there will actually be some overlapping of the two bights, as shown in FIG. 7. The element parts leave the last two bights 34 and extend around the insulator and then the line at which points there is further spreading of the helices, which spreading is effected by wrapping and pulling on the element as it is wrapped. It is particularly desirable that the grip enhancing material be used in at least the line engaging portion, although it may be used throughout the length of the element, to hold the spacing as indicated in the figures to thus insure adequate tension on the bights and loops.

FIG. 11 illustrates another mode of use of the device where two of the elements are used to increase the security of the tie.

In this instance, the elements are both wrapped around the line where it is disposed in the support and each is wrapped around the insulator and the ends are disposed around the line. The preferrred way of assembling is to first wrap one of the helices 40 around the line for several convolutions and also around the line at 40a where it lays in the groove. Then the straightened part of the helical element is carried around the neck of the insulator, as indicated at 40b, and the helical end 40c wrapped around the line between the convolutions that were first wrapped around the line.

Next, the other element 42 has the first helical part wrapped around the line and where the line sets in the groove has the helix wrapped around the line at 42a. In this stage there may be some overlapping of the part 42a with 40a. The straightened part is then taken around the other side of the support neck at 42b and around back on the line and wrapped between the convolutions 42 at 42c.

FIG. 12 shows a similar device where the two elements are each formed with a bight which passes completely around the insulator neck and with the helical ends wrapped around in the same manner as stated. As in the other devices, the helix 44 may be wrapped around the line and the straightened part 44a wrapped completely around the insulator neck after which the other helical end 44b is wrapped in between the convolutions of the first helical end. The other element is placed on the line and supported in a similar manner, a helical end 46 being first wrapped around the line and then the straightened portion 46a carried around the neck of the support and the other helical end 46b wrapped around the line between the convolutions of the first helical end.

Figure 16:
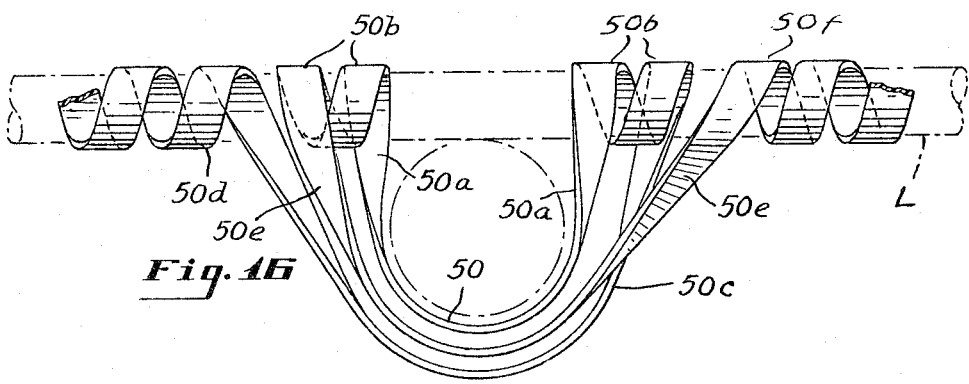
FIG. 16 is a fragmentary expanded view of the tie as viewed in FIG. 14, with the line and support shown in phantom.

FIGS. 13 to 16 inclusive show the manner of using the tie with a spool type support, FIG. 16 being an enlarged and expanded view for the purpose of explanation.

The preferred manner of application is to first provide a straightened portion 50 which is placed on the neck of the support and then carried up to the line on opposite sides at 50a, after which two convolutions are wrapped around the line at 50b. Then a second straightened portion is provided at 50c which extends around the support and engages with the line to the left of the support, the remaining helical portions 50d being wrapped around the line and extending to the left, as viewed in FIG. 16. Then a third straightened portion is provided at 50e extending from the convolutions 50b on the left side of the support, around the support and up to the line on the right side of the support where the remaining helical part 50f is wrapped around the line extending to the right.

Figure 17:
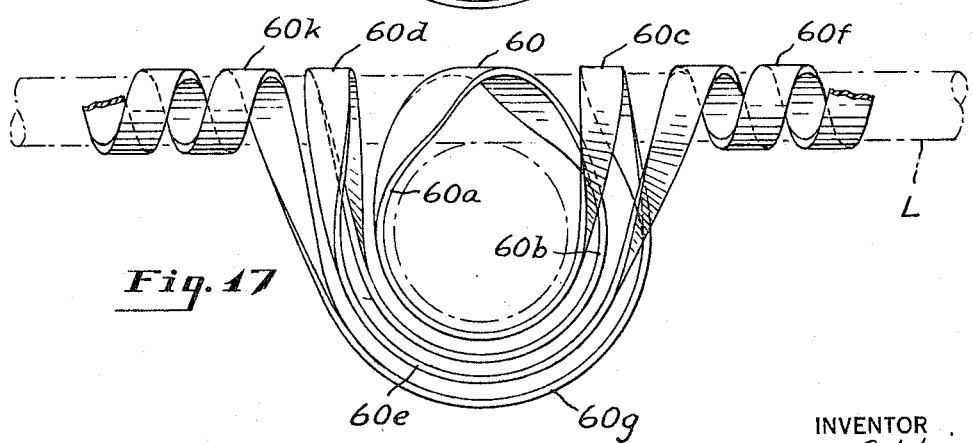
FIG. 17 is an expanded view, similar to FIG. 16, showing another manner of forming the tie.

FIG. 17 shows a modified form of wrapping where an additional loop is provided around the line and support to provide additional holding power when desired. In this instance, the center part of the element is straightened and placed over the line at 60 and with parts 60a and 60b extending from the line around the support in opposite directions, the part 60a being wrapped around the support first and extending up to and around the line at 60c. The part 60b extends from the line over the part 60a, around the support and up to and around the line at 60d. At this point it should be observed that the flexibility and the helical formation of the element assists in the operation since the helix grips the line at the point 60c and leaves the hands free to manipulate the part that goes to the left.

The helix is again straightened to provide a part that starts from the line gripping portion 60d and extends down and around the support at 60e and then is carried up to and the unstraightened helical portion 60f wrapped around the line extending to the right. Subsequently the helix extending from 60c is temporarily straightened, as were the others, carried down around the support at 60g, then up to the line and the remaining helical portion 60k wrapped around the line extending to the left, as viewed in FIG. 17.

The above provides a total of four loops extending around the support.

FIGS. 18 and 19 show a simplified use of the device in connection with a support which may be secured to the top of a pole. The support, of course, may be used in other places. In this instance, the top of the pole is shown at 70. The support member comprises a shank part 71 which may be secured to the pole or cross arm by lag screws or through bolts 72. Above the shank 70 is a bulbous portion 74 above which it is necked down at 76 and the top provided with a generally U-shaped seat or groove 78 extending across the top of the support. Spaced below the top groove, and in the neck 74, a through hole 80 is provided which is parallel to the top groove.

The line L is laid in the groove 78 and a helical element has one end 82 wrapped around the line. Then a portion at the mid-section is straightened out at 82a and passed through the hole 80. The other end 82b is then wrapped around the line on the other side.

The device also lends itself to the holding of lines in the spreader arms frequently used for spacing conductors. As is well known, the spreaders are usually of a ceramic material and have several arms extending from a center portion equally spaced from each other. Obviously the number of arms may be varied depending upon the number of conductors to be held. FIG. 20 shows one of the arms at 90, the end of which is provided with a hook-shaped part 90a which has a seat 90b A rubber gasket or guard 90c may be provided in the bottom of the seat.

The line M, which in this case is a messenger wire, is inserted in the seat 90b on the guard. The element 94 is then wrapped around the line. It is then carried around the hook end for one complete wrap, as shown at 94a, and around to the other side where it is wrapped around the line at 94b.

Th descreiption of the above ways in which the device may be used illustrates the versatility of the device, it being clear that it may be used as a universal tie in substantially all the places where annealed wire was previously used. It has the advantage that it requires no tools for installation. Due to the resiliency of the material it has no tendency to work loose for although it may stretch slightly, during line vibrations, it always attempts to return to its original helical formation. As time passes the shrinking of the material enhances its gripping power.

A still further advantage is that it may be removed and placed back on the line. The ribbon-like quality of the material although offering an excellent grip with the line does not tend to deform the line. Neither does it cause any damage to the insulator.

Having thus described the invention in some embodiments thereof, I am aware that numerous and extensive departures may be made from those shown without departing from the spirit or scope of the invention as defined by the appended claims.

I claim:
1. In combination with a line and a support having a groove forming a neck on the support with said line being disposed in the groove, a preformed line tie tying the line to the support which comprises a helical ribbon having close wound convolutions which are wide, and the thickness thin, formed of a highly resilient material, said convolutions being capable of being easily spread and uncoiled by hand and to be held in a straightened position and capable of returning to its original helical conformation when released, said ribbon being temporarily straightened intermediate its opposite ends and said straightened portion being wrapped around the support on the opposite side of the groove from the line and said remaining helical ends being wrapped around the line on opposite sides of the support and extending in opposite directions.

2. The combination as described in claim 1, wherein said straightened portion is wrapped around the line where it is in the support.

3. The combination as described in claim 1, wherein said straightened portion has a wrap around the line opposite to the center of the support.

4. The combination as described in claim 1, wherein said straightened portion is wrapped around the line on opposite sides of the center of the support and then extends in opposite directions around the support and to the line.

5. In combination a line and a support for the line having a groove receiving the line and means tying the line to the support comprising first and second elements each shaped in the form of a helix having close convolutions and of a highly resilient material capable of temporary deformation, said helix of said first element being temporarily straightened intermediate its ends and being wrapped around the line in a zone extending opposite the center of the support and with the one helical end being wrapped around the line and extending away from the support and the straightened portion extending around the support in one direction and the other helical end being wrapped between the convolutions of the first helical end, said helix of the second element being temporarily straightened intermediate its ends and being wrapped around the line in the zone opposite the center of the support with one helical end being wrapped around the line and extending away from the support in the direction opposite that of the first element and the straightened portion extending around the support in the other direction from that of the first element and the other helical end being wrapped between the convolutions of the first helical end.

6. In combination with a line and a support for the line having a groove and the line disposed in the groove and means tying the line to the support comprising first and second elements each shaped in the form of a helix having close convolutions and of a highly resilient material capable of temporary deformation, said helix of said first element being temporarily straightened intermediate its ends, one end of the helix of the first element being wrapped around the line to one side of the support and said straightened portion being wrapped at least partially around the support and having at least one wrap around the line supported in the groove; and the other helical end being wrapped between the convolutions of the first helical end said helix of the second element being temporarily straightened intermediate its ends, one end of the helix of the second element being wrapped around the line to the other side of the support than that of the first element and said straightened portion of the helix being wrapped at least partially around the support in the opposite direction than that of the first element and having a wrap around the line supported in the groove and the other helical end being wrapped between the convolutions of the first helical end.

7. In combination with a line and a support having a top groove and a neck with said line being disposed in the top groove, a preformed line tie tying the line to the support which comprises a helical ribbon having close wound convolutions which are wide, and the thickness thin, formed of a highly resilient material, said convolutions being capable of being easily spread and uncoiled by hand and to be held in a straight position capable of returning to its original helical configuration when released, said ribbon being temporarily straightened intermediate its opposite ends and said straight portion being wrapped around said neck, said portion wrapped around said neck defining at least one loop means extending substantially completely around said insulator, and said remaining helical ends being wrapped around the line on opposite sides of the support and extending in opposite directions.

8. The combination of claim 7, wherein said straightened portion of the loop means has a first portion extending half way around the neck of the insulator in one direction, a second portion wrapped over the line in the groove, and a third portion extending half way around the neck of the insulator in the opposite direction of said first portion of the loop means.

9. The combination of claim 7, wherein said straightened portion has at least one bight wrapped around the line adjacent the insulator on each side of the insulator.

References Cited by the Examiner
UNITED STATES PATENTS

| | | | |
|---|---|---|---|
| 2,275,019 | 3/1942 | Peterson | 174—42 X |
| 2,947,504 | 8/1960 | Ruhlman | 174—173 X |
| 3,042,745 | 7/1962 | Williams | 174—173 |

LARAMIE E. ASKIN, *Primary Examiner.*